UNITED STATES PATENT OFFICE.

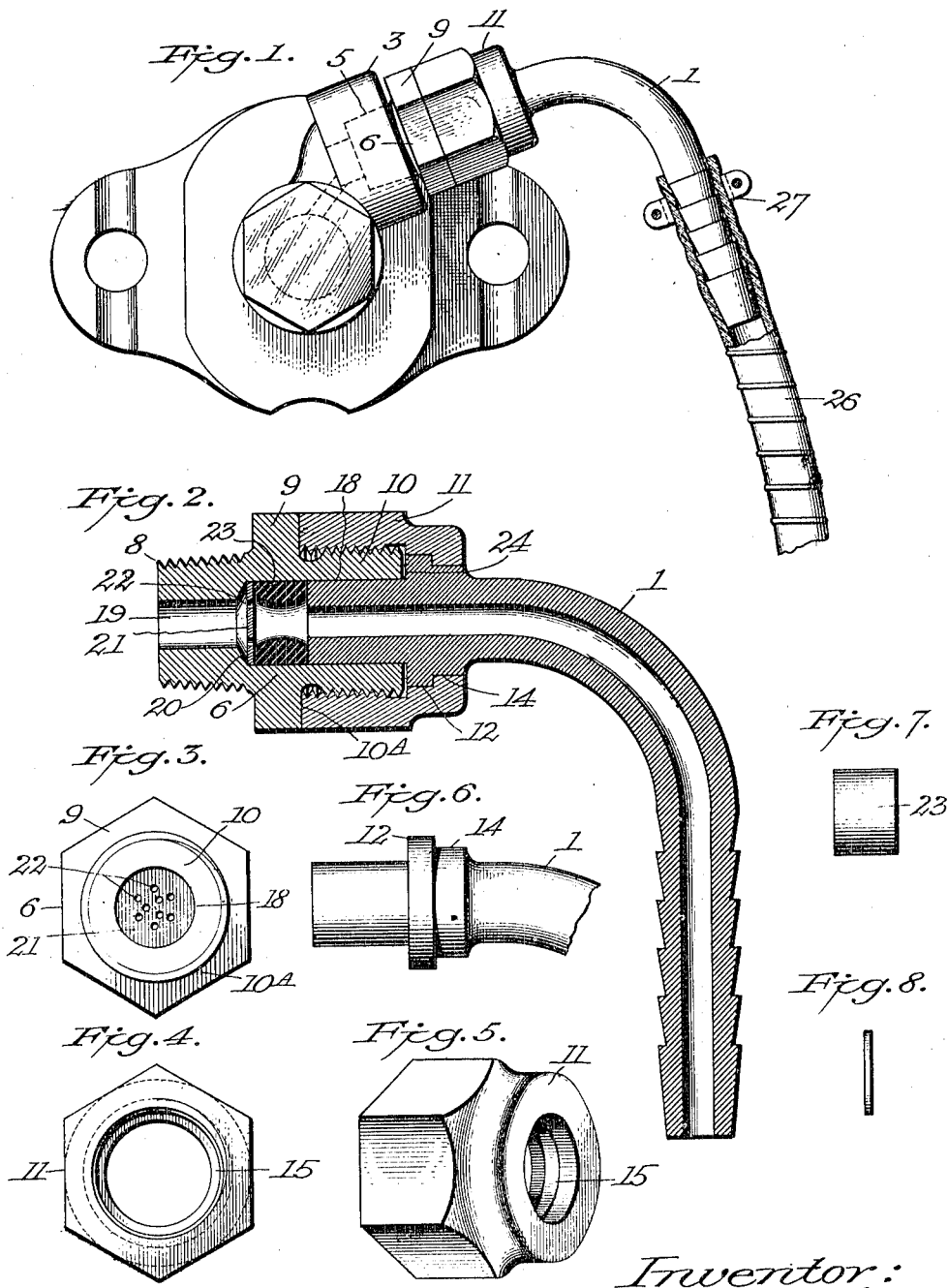

JOHN GEORGE LEYNER, OF DENVER, COLORADO.

FLUID-TIGHT SWIVELING COUPLING.

1,096,436.     Specification of Letters Patent.     Patented May 12, 1914.

Application filed January 2, 1912. Serial No. 668,849.

*To all whom it may concern:*

Be it known that I, JOHN GEORGE LEYNER, a citizen of the United States of America, residing in the city and county of Denver and State of Colorado, have invented a new and useful Fluid-Tight Swiveling Coupling, of which the following is a specification.

My invention relates to a new and improved fluid-tight swiveling coupling for pipe fitting members having hose connections to machines having, when in operation, a vibratory trembling or a severe jarring movement that tends to loosen the couplings of piping or hose attached to them, my invention being particularly designed for use in coupling the water supply conveying hose to rock drilling engines; and the objects of my invention are: First, to provide a swiveling hose coupling elbow, or nipple or pipe coupling member, that will be fluid-tight to water, air, steam, or other fluids, and that will remain tight when connected to machines having an intense vibratory, trembling, or a severe shaking movement when in operation. Second, to provide a swiveling water-tight and a vibratory, jarring or shaking movement resisting coupling joint connection for the water inlet aperture connecting elbows or nipples used on the rear cylinder heads of water and other fluid using rock drilling engines. I attain these objects by the mechanism illustrated in the accompanying drawings, in which:

Figure 1, is a side view of the improved coupling, showing the same attached to the back head of a rock drill. Fig. 2, is a sectional view through the coupling, showing an elbow fitting in full lines and a nipple fitting in dotted lines. Fig. 3, is a front view of the bushing plug, showing the perforated strainer therein. Fig. 4, is a front view of the union which connects the swiveled fitting to the bushing plug. Fig. 5, is a perspective view of the union. Fig. 6, is a side view of the end of the fitting which connects with the bushing. Fig. 7, is a side view of the rubber washer which is compressed between the end of the fitting and the strainer disk. And Fig. 8, is an edge view of the strainer disk.

Similar letters of reference refer to similar parts throughout the several views.

Referring to the drawings: The numeral 1 designates a bent or elbow pipe fitting member which I have preferably illustrated applied to a rear-cylinder head of a rock drilling engine, although my improved coupling can be applied equally as well to nipples or the ends of lengths of pipes, as is shown in Fig. 2, in which the full lines represent my invention applied to a bent or elbow fitting, and the dotted lines represent a nipple fitting on a piece of pipe.

The elbow 1 illustrated in Fig. 1 is shown attached to a part 3, of a machine, into which it is desired to convey a fluid such as compressed air or steam or water. This machine portion 3 in Fig. 1, to which the elbow is connected, represents the rear cylinder head of a rock drilling engine, such as is illustrated in my pending application Serial No. 644,151, filed August 15, 1911, for improvements in water conveying apparatus for ejecting rock drillings for rock drilling engines, and was especially designed for the purpose of coupling the water conveying hose to the drilling engine with a coupling joint connection that would not work loose, and consequently leak under the constant vibratory jarring movement of the rock drilling engine when drilling holes in rock, as I have found in practice that the pipe and hose couplings in common and general use will invariably work loose under the severe and constant vibratory trembling and jarring movement of the drilling engine when in operation.

To the fluid inlet aperture 5, of the machine, to which the coupling is to be attached, a bushing or plug member 6 is secured, preferably by being threaded thereto, although it may be secured in any other suitable manner. In the rear cylinder head illustrated, however, a threaded fluid inlet aperture is shown, into which a tapering threaded end 8, that is formed on the bushing member 6, is screwed. This bushing 6, is provided with a wrench receiving portion 9, and also with a straight threaded end portion 10, that ends in a flat shoulder 10^A, that is formed at the inner end of the thread against the adjacent side of the wrench receiving portion, which is preferably a hexagon surface formed around the bushing. This straight threaded end portion projects from the opposite side of the wrench receiving portion 9, from the taper threaded end 8, and a union sleeve member 11 is interiorly threaded to screw onto it against the flat shoulder on the side of the wrench receiving portion. This union sleeve member of my improved coupling is preferably of hexagon form in order to readily receive a wrench, and this sleeve is arranged to fit loosely on the elbow or other pipe fitting member, on the end of which my improved coupling is formed. The elbow or other pipe fitting member upon the end of which my coupling is to be formed, is provided with an enlarged portion 12, adjacent to the terminal end of its coupling end portion, which is turned or otherwise made round, and is provided with a round stepped shouldered portion 14, and the union sleeve 11 is also provided with a bored shoulder portion 15, within its axial bore, which is arranged and adapted to fit over and against the shouldered portion 14 of the elbow or other fitting and permit the elbow or other fitting to be turned in the sleeve and also in the bushing, as will be presently described.

The bushing member 6, is provided with an axial bore, that extends through it and which is preferably made in two different diameters, 18 and 19, that unite within the bushing in a shoulder 20. The larger bore 18, extends into the union sleeve connecting end of the bushing, and in the bottom of this larger bore 18, against the shoulder, a disk 21, is inserted. This disk may be made of any suitable metal or material, but it is preferably made of brass and is also preferably made to fit tight enough in the bore to be pressed or driven into its place in the bore against the shoulder and to remain rigidly fastened therein. This brass disk is provided with a number of small perforations 22, which extend through it and form a screen for the entering water or other fluid to flow through. A rubber ring 23, is placed in the bore 18, and it is arranged to fill this bore closely and to be pressed into place against the brass plate, and to remain there by its expanding resilient tension against the wall of the bushing's bore. The terminal end of the elbow is made to extend into the bore 18 of the bushing member with a close but slidable fit, and this terminal end portion is made of such a relative length to the length of the straight threaded nipple portion of the bushing that a clearance space 24, is formed between its enlarged portion 12 and the end of the nipple portion of the bushing so that the sleeve can be screwed tightly up against the flat shoulder portion of the wrench receiving portion of the bushing and still leave a clearance space between the enlarged portion 12, and the end of the nipple of the bushing. This terminal end of the elbow and the rubber ring and the screening disk are so relatively arranged in the bushing to the length of the threaded nipple portion of the bushing and of the union sleeve, that the union sleeve will screw easily by the fingers of an operator, about three quarters onto the threaded nipple portion of the bushing, and at about this three quarters position of the sleeve on the nipple the inner end of the coupling end of the elbow will engage the rubber ring which is tight against the perforated disk. Then as the sleeve is screwed farther onto the threaded nipple portion of the bushing and up against the flat shoulder 10^A, the end of the terminal portion of the coupling is forced against the rubber ring and severely compresses it between its end and the perforated screening disk. The opposite end portion of the elbow or other pipe fitting member from the end on which my coupling is formed, is provided with any desired hose or pipe connecting member.

The operation is as follows: When applied to the water inlet aperture of the rear cylinder head of a rock drilling engine, the bushing is first provided with the perforated plate and the rubber ring, which are pressed into it and remain there permanently. The bushing is then screwed very firmly into the threaded inlet aperture of the rear cylinder head and the elbow or nipple is secured to a length of hose 26, by any suitable means. I preferably use a clamp 27, for this purpose. The hose extends to a supply of water under pressure, and the terminal end of the elbow is inserted by the operator in the axial aperture of the bushing, and the union sleeve is threaded onto the outer threaded nipple portion of the bushing as far as it can be by hand, then a wrench is applied to its wrench receiving portion and it is screwed up tightly against the shoulder of the bushing and as this is being done the terminal end of the coupling engages and compresses the rubber ring and makes a water tight joint, and at the same time the elbow is free to be turned or to turn with a turning or shifting movement of the hose within both the sleeve and the bushing. Consequently, my improved coupling connecting fitting provides a swiveling joint for elbows and nipples that provides a water and fluid-tight and swiveling joint and a vibratory jarring movement resisting coupling connecting fitting, and while I have illustrated and described the preferred construction and arrangement of my invention, I do not wish to be limited to the construction and arrangement shown.

Having described my invention, what I claim as new and desire to secure by Letters Patent is:

A swivel-coupling comprising a bushing having threaded end-portions, a central wrench-applying shoulder, and a bore of two diameters; an elastic ring within the bore of larger diameter; a perforated disk between said elastic ring and the bore of smaller diameter; a pipe-member fitting within the bore of larger diameter with its end abutting said elastic ring; a shoulder on said pipe-member adjacent to but spaced from the end of the bushing; and a union-sleeve interiorly threaded to engage the threads of the end of the bushing adjacent said pipe-member, and provided with an end collar adapted to extend over and engage the shoulder of the pipe-member to force said pipe-member inward against the elastic ring.

In testimony whereof I affix my signature in presence of two witnesses.

JOHN GEORGE LEYNER.

Witnesses:
G. SARGENT ELLIOTT,
FREDERICK WILLIAM KRONENBERG.